(12) United States Patent  (10) Patent No.: US 7,536,959 B2
Bazzell et al.                (45) Date of Patent:    May 26, 2009

(54) STOWABLE TABLE

(75) Inventors: Gary L. Bazzell, Everett, WA (US);
Tom M. Jensen, Everett, WA (US)

(73) Assignee: The Boeing Company, Chicago, IL (US)

( * ) Notice: Subject to any disclaimer, the term of this patent is extended or adjusted under 35 U.S.C. 154(b) by 465 days.

(21) Appl. No.: 10/907,600

(22) Filed: Apr. 7, 2005

(65) Prior Publication Data

US 2006/0225625 A1    Oct. 12, 2006

(51) Int. Cl.
*A47B 23/00*      (2006.01)

(52) U.S. Cl. .............................. 108/42; 108/47; 108/48; 108/152; 108/44

(58) Field of Classification Search .................. 108/42, 108/44, 47, 48, 152
See application file for complete search history.

(56) References Cited

U.S. PATENT DOCUMENTS

| 3,485,382 | A | * | 12/1969 | Larson ....................... 211/150 |
| 3,583,760 | A |   | 6/1971  | McGregor |
| 3,606,846 | A |   | 9/1971  | Andrews et al. |
| 3,632,161 | A |   | 1/1972  | Arfaras |
| 4,136,622 | A | * | 1/1979  | Bue et al. ..................... 108/48 |
| 4,848,244 | A | * | 7/1989  | Bennett ....................... 108/48 |
| 4,852,940 | A |   | 8/1989  | Kanigowski |
| 5,086,527 | A | * | 2/1992  | Takahashi et al. ............. 108/42 |
| 5,408,936 | A | * | 4/1995  | Tseng ......................... 108/42 |
| 5,487,342 | A |   | 1/1996  | Mack |
| 5,655,459 | A | * | 8/1997  | O'Connor et al. ............. 108/48 |
| 5,775,655 | A | * | 7/1998  | Schmeets ..................... 108/42 |
| 6,308,641 | B1 |  | 10/2001 | Kingbury |
| 6,761,398 | B2 |  | 7/2004  | Bentley et al. |
| 2003/0188672 | A1 | | 10/2003 | Parent et al. |

FOREIGN PATENT DOCUMENTS

GB          2 340 389 A      2/2000
WO      WO-03-064207 A1     8/2003

* cited by examiner

*Primary Examiner*—José V Chen
(74) *Attorney, Agent, or Firm*—Ostrager Chong Flaherty & Broitman P.C.

(57) ABSTRACT

A stowable table is provided having a tabletop with a top surface that faces outward when stowed and upward when deployed. In one embodiment, the stowable table includes a tabletop, a support bracket and a back member. The tabletop has a top surface, a bottom surface and an end. The support bracket has an upper end and a lower end, wherein the upper end is pivotally connected to the bottom surface of the tabletop. The back member has a bottom end, a top end, a back side and a front side, where the front side extends between the bottom end and the top end, wherein the lower end of the support bracket is pivotally connected to the bottom end, and the end of the tabletop is positionably connected to the front side between a stowed position and a deployed position. The stowable table is selectively attachable to a wall or may use the wall as a member.

14 Claims, 6 Drawing Sheets

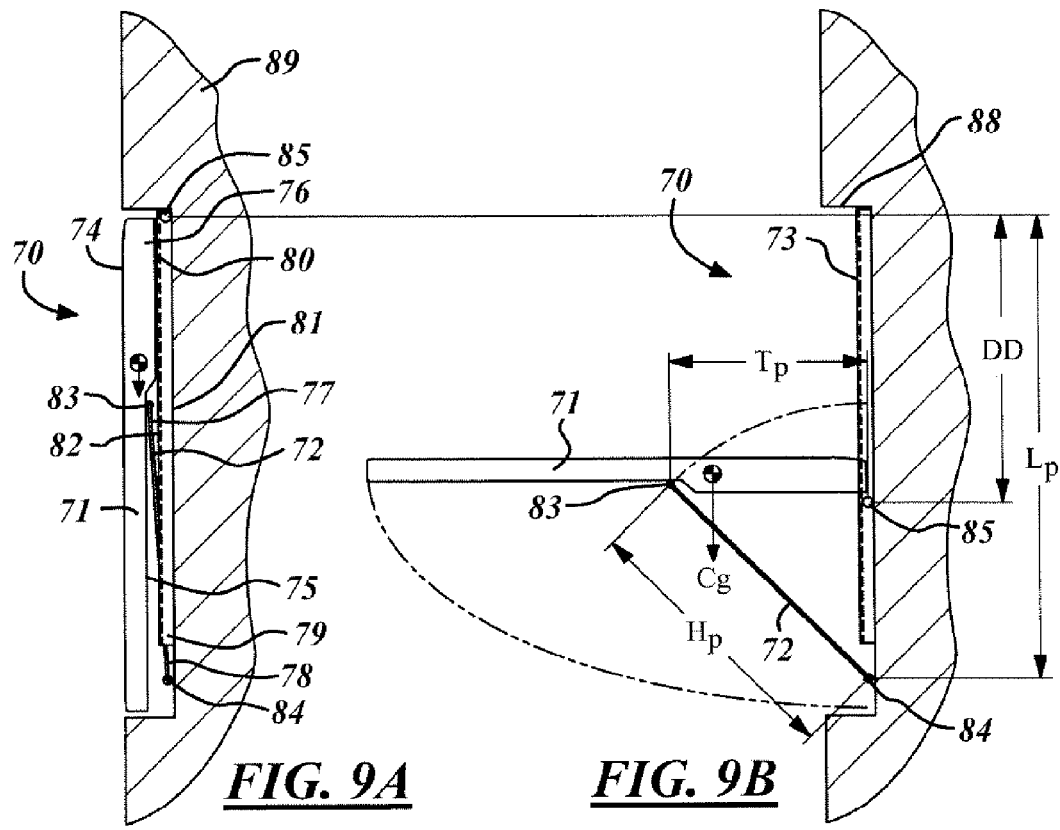
FIG. 9A    FIG. 9B
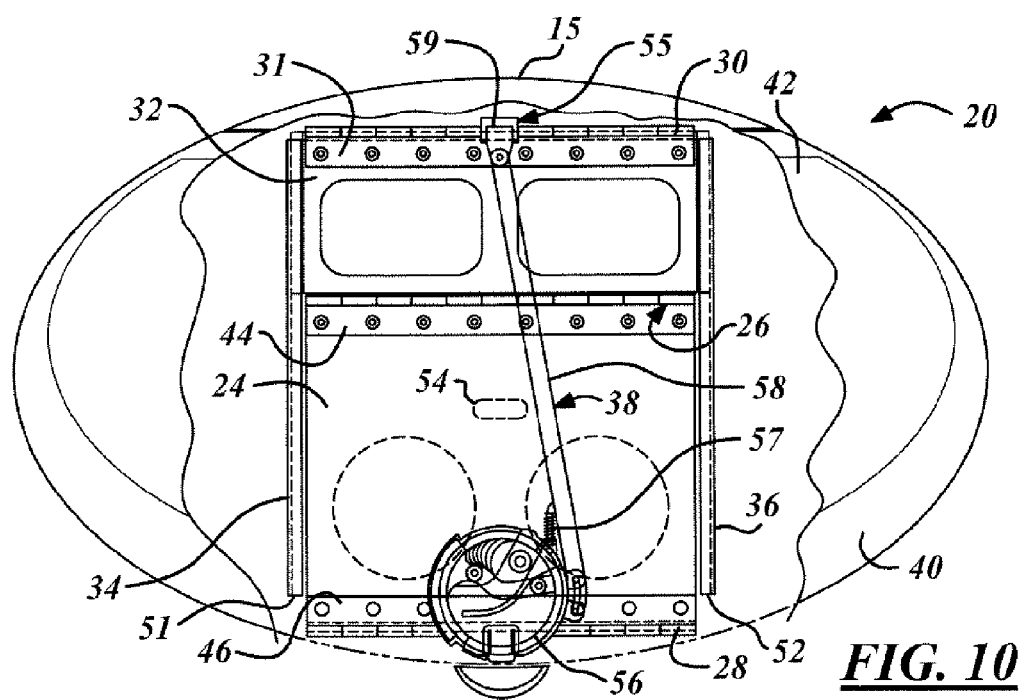
FIG. 10

//ration.
STOWABLE TABLE

TECHNICAL FIELD

The present invention relates generally to a stowable table, and more particularly, to an assembly for deploying a front facing surface of a stowable table when stowed.

BACKGROUND DESCRIPTION

Fold down tables, like infant diaper changing tables, are used on board aircraft and in other locations such as restrooms in order to facilitate providing a raised surface upon which work or tasks are more easily completed. The typical table is generally a rectangular platform about 27 inches wide and 15 inches deep, attached to the lavatory or other interior wall via a hinged joint. In particular, the infant changing table is normally found in the stowed position within the lavatory. Releasing a latch allows the platform to pivot downward from a vertical to a horizontal position conveniently exposing the "tabletop" or usable work surface, thereby allowing the user to utilize the work surface in its deployed position. However, this changing table may undesirably transfer debris to other surfaces when placed back into the stowed position, which is undetectable until the table is deployed by cleaning personnel.

A table system that has a spherical hinge arrangement permitting substantially universal movement of the table between its stowed position and various positions of use is described in U.S. Pat. No. 4,852,940 entitled "Stowable Table System." Although the table has a compound rotational movement about a hinge, the table surface has the undesirable result of being folded into a cavity when stowed. Another table system is described in U.S. Pat. No. 5,487,342 entitled "Stowaway Table." This table has a foldable table leaf that folds out when the table is lifted up and out, and is further supported by a strut. Although this table stows away, the table leaf is folded onto another leaf and then again into the cavity of a support frame for stowage having the undesirable effect mentioned above. Also, the strut is undesirably exposed when the table leaf is deployed or stowed. Yet another table system is described in U.S. Publication 2003/0188672 entitled "Stowable Surface" having the same undesirable effect of an inboard leaf that folds on top of the outboard leaf leaving the tabletop unexposed when stowed.

Like the prior art just mentioned, the changing tables are utilizable for any particular purpose when folded outward exposing the work surface. However, changing tables inconveniently require cleaning personnel, i.e., janitors, ground service personnel or others, to deploy the work surface in order to expose and clean the work surface. Another disadvantage is the delay caused by the increased time required to clean the work surface, which may lead to an increase in turn around times on commercial transports such as airplanes and passenger trains. Increased turn times result in lost revenue for the commercial transportation supplier and delays in cleaning the transport may cause unnecessary passenger frustration. Therefore, it would be desirable to provide a changing table designed with the work surface of the platform exposed while in the stowed position allowing ground service or cleaning personnel unrestricted access to this surface. Also, it would be desirable to provide a changing table that normally stows in a vertical orientation, against an interior bulkhead of a passenger lavatory or on any other wall with the work surface facing outward thereby allowing use of the work surface at a convenient height when deployed to the horizontal position. Moreover, a changing table is needed that reduces turnaround time and required effort for aircraft or other cleaning personnel to clean the work surface. Lastly, a changing table is needed that stows away and is also deployable in areas with limited space.

SUMMARY OF THE INVENTION

Accordingly, a stowable table is provided. The stowable table provides a table top for areas with limited space. Also, the stowable table may reduce turnaround time and required effort when aircraft or other cleaning personnel clean the tabletop surface. Moreover, the stowable table advantageously provides a tabletop surface that normally stows in a vertical orientation, against an interior bulkhead, a passenger lavatory or on any other wall with the tabletop surface facing outward and allowing use of the tabletop surface at a convenient height when deployed into a horizontal position. Lastly, the stowable table is designed with the tabletop surface exposed while in the stowed position thereby allowing ground service or cleaning personnel unrestricted access in order to clean the surface, without unnecessarily having to deploy the table to get at it.

In one embodiment, the stowable table incorporates a unique combination of support members, pivotal and positionable hinges, and a latch system that allows the stowable table to be folded away when not in use. The table can be stowed in a vertical orientation, against an interior bulkhead with the usable surface, i.e. tabletop, facing outward when closed. Since the tabletop faces out, it is easy and quick to clean by service cleaning personnel. The stowable table of this embodiment includes slide-rail supports that positionably retain one part of a hinge, and with the tabletop connected to the other part of the hinge allows rotational movement when the tabletop is positioned into one of its positions. The table of this embodiment provides strong supports that will meet a 300 lb load requirement typically required by the air transport industry making the table suitable for many uses including a baby changing table. The stowable table has many other possible applications, including but not limited to a table, tray, shelf, or platform. Of particular interest on an airplane would be to use the stowable table as a deployable conference table, reading tray, computer table, or a baby changing table. The stowable table is not limited to airplane applications, since it could be useful on trains, boats, recreational vehicles, small apartment, dorms, cruise ships, and other vehicles, and may also include many other applications.

In another embodiment, the stowable table includes a tabletop, support bracket and a back member. The tabletop has a top surface, a bottom surface and an end. The support bracket has an upper end and a lower end, wherein the upper end is pivotally coupled to the bottom surface of the tabletop. The back member has a bottom end, a top end, a back side and a front side, where the front side extends between the bottom end and the top end, wherein the lower end of the support bracket is pivotally connected to the bottom end, and the end of the tabletop is positionably connected to the front side between a stowed position and a deployed position. Thus the top surface of the tabletop faces outward when stowed and upward when deployed when the backside of the back member is selectively attachable to a surface wall.

These and other embodiments of the stowable table are presented below.

Other aspects and advantages of the present invention will become apparent upon the following detailed description and appended claims, and upon reference to the accompanying drawings.

BRIEF DESCRIPTION OF THE DRAWINGS

FIG. 9A shows a partial cross-sectional side view of a stowable platform in a stowed position in accordance with a third embodiment of the present invention being used to advantage.

FIG. 9B is a partial cross-sectional side view of the stowable platform of FIG. 9A shown in a deployed position.

FIG. 10 shows a partial cross-sectional view of the stowable surface of FIG. 4.

DETAILED DESCRIPTION OF THE INVENTION

Figure 1:
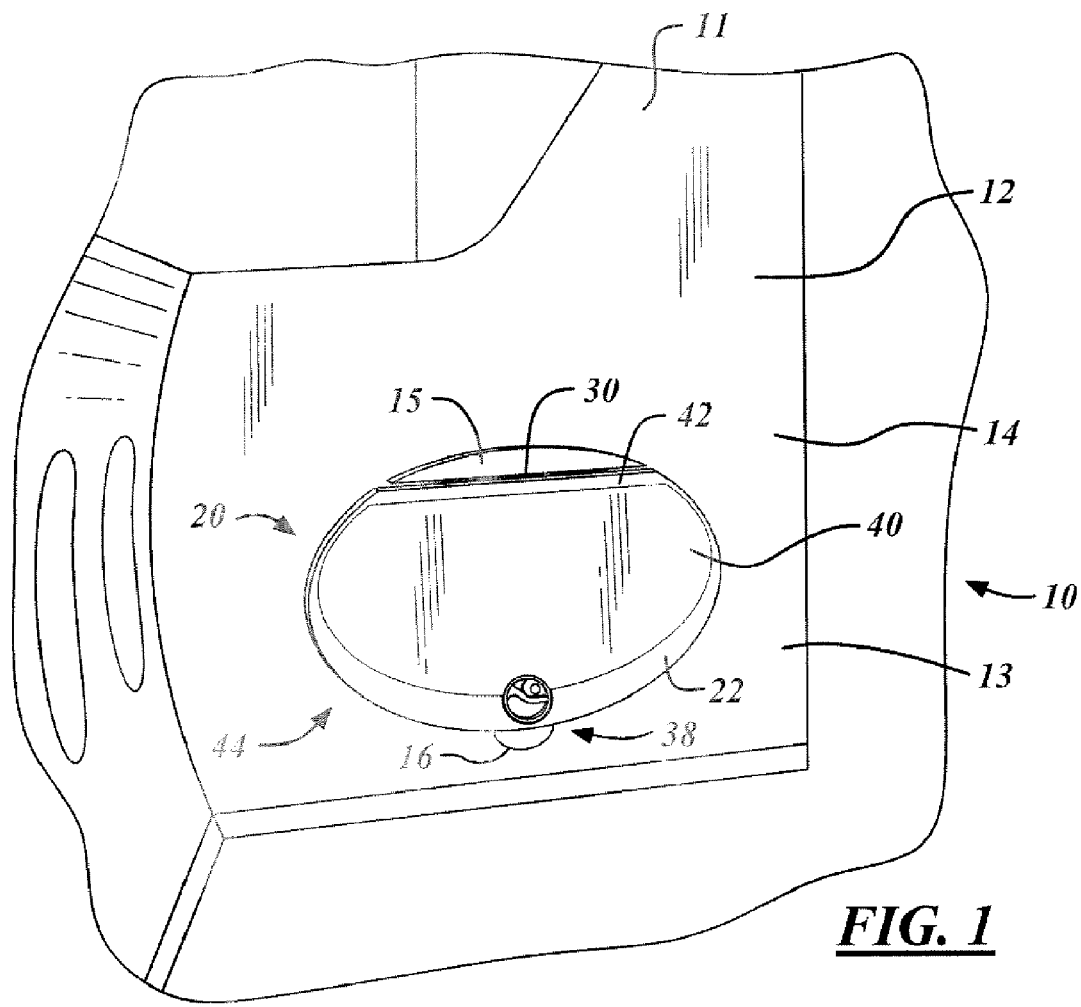
FIG. 1 shows a partial isometric view of a stowable surface being used to advantage in a stowed position on an aircraft in accordance with a first embodiment of the present invention.

In the following figures the same reference numerals will be used to identify the same components of a given embodiment.

FIG. 1 shows a partial isometric view of a stowable surface 20 being used to advantage in a stowed position 47 on an aircraft 10 in accordance with a first embodiment of the present invention. Passenger aircrafts have bulkheads, partitions, and walls suitable to support tables that are attached and self-storing thereon. A wall 11 on the aircraft 10 typically includes a front side 12 that may be proportioned into a lower portion 13 and a mid portion 14 to which the stowable surface 20 may be attached.

Figure 6:
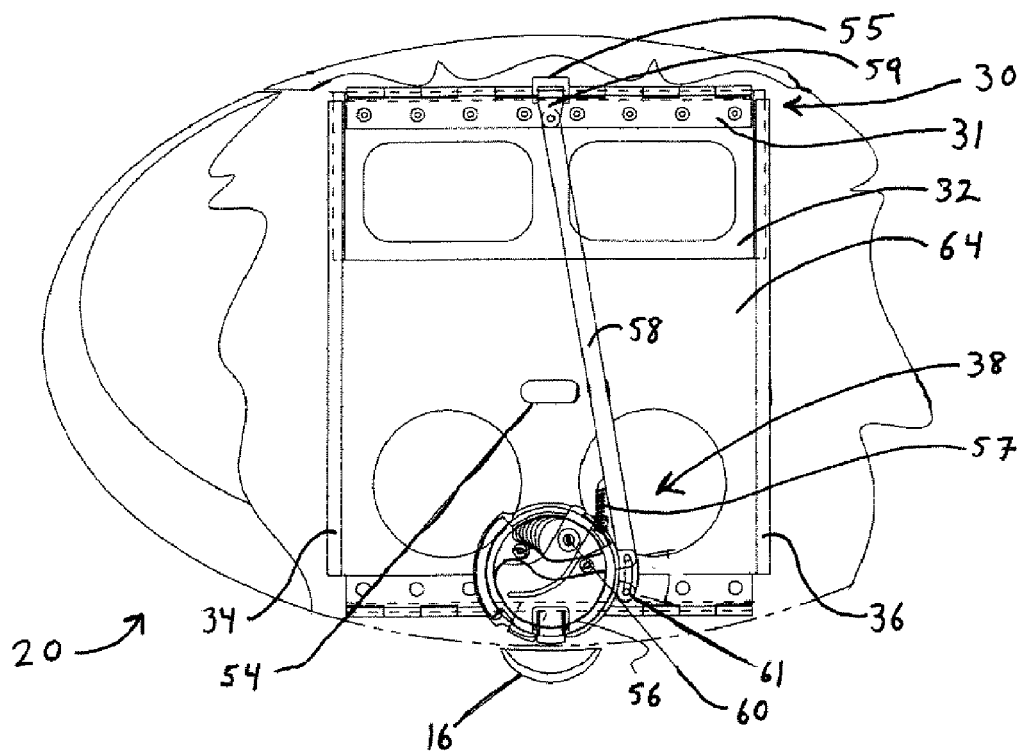
FIG. 6 shows a partial cross-sectional view of the stowable surface of FIG. 4.
Figure 4:
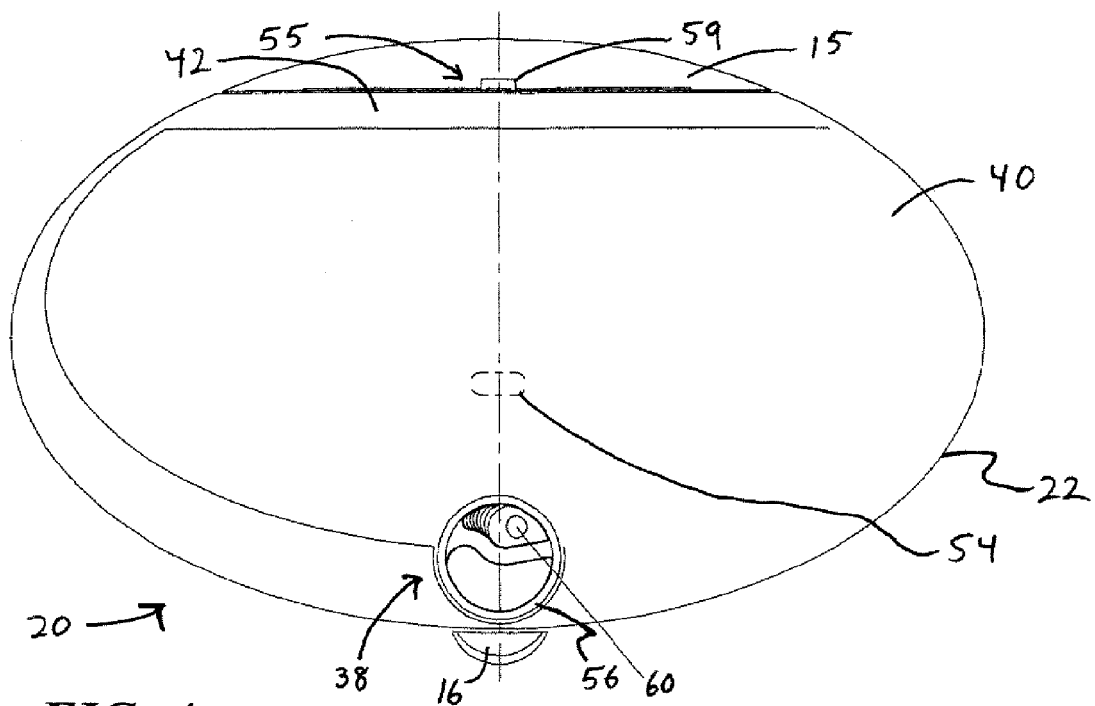
FIG. 4 shows a front view of a stowable surface in accordance with the first embodiment of the present invention.

Simultaneous reference may be made to FIGS. 4, 6 and 10, which show the first embodiment of the invention in FIG. 1 being used to advantage. FIG. 4 shows a front view of a stowable surface in accordance with the first embodiment of the present invention. FIG. 6 shows a partial cross-sectional view of the stowable surface of FIG. 4. FIG. 10 shows a partial cross-sectional view of the stowable surface of FIG. 4. The stowable surface 20, shown in a stowed position 47 in FIG. 1, includes a first pivotal coupler 26, a second pivotal coupler 28, a third pivotal coupler 30, a tabletop 22, a latch system 38, a support bracket 24, a first rail 34 and a second rail 36. The latch system 38 is connected to the tabletop 22 allowing for deployment between a stowed position 47 and a deployed position 48.

The tabletop 22 has a top surface 40, a bottom surface 41 and a back end 42. The third pivotal coupler 30 has a first part 31 and a second part 32, where the first part 31 is connected to the back end 42 of the tabletop 22. The support bracket 24 has an upper end 44 and a lower end 46. The upper end 44 of the support bracket 24 is pivotally connected to the bottom surface of the tabletop by the first pivotal coupler 26. The lower end 46 of the support bracket 24 is pivotally connected to the lower portion 13 of the wall 11 by the second pivotal coupler 28.

The first rail 34 is connected to the wall 10 extending from the lower portion 13 through the mid portion 14. The second rail 36 runs substantially parallel to the first rail 34 and is connected to the wall 10 extending from the lower portion 13 through the mid portion 14. The first rail 34 and the second rail 14 positionally retain the second part 32 of the third pivotal coupler 30 between the rails 34, 36, thereby allowing pivotal rotation between the first part 31 and the second part 32 of the third pivotal coupler 30 while the second part 32 is positioned along the wall 10 between the stowed position 47 and the deployed position 48.

The inventive stowable surface 20 allows the top surface 40 of the tabletop 22 to face outward when stowed and upward when deployed. The stowable surface 20 may be positioned into any position by actuating the latch system 38 thereby releasably retaining the tabletop 22 from the wall 11 so that the tabletop 22 may be located to a new position and fixedly connected again to the wall 11.

One advantage to the first embodiment is that the rails 34, 36 positionably retain the second part 32 of the third pivotal coupler 30, thereby securing the stowable surface assembly to the wall between the stowed and deployed positions when the latch system is disengaged. This has the additional advantage of keeping the assembly in an assembled state. Optionally, it is recognized that the third pivotal coupler 30 and the rails 34, 36 may be eliminated where the latching system 38 that is connected to the tabletop 22 includes other engagement couplings for connecting it to the wall 10. Optionally, the latching system may releasably engage a strike 16 that is attached to the wall 10 or may releasably engage a trim 15 for locating the stowable surface 20 into the stowed position.

Figure 7:
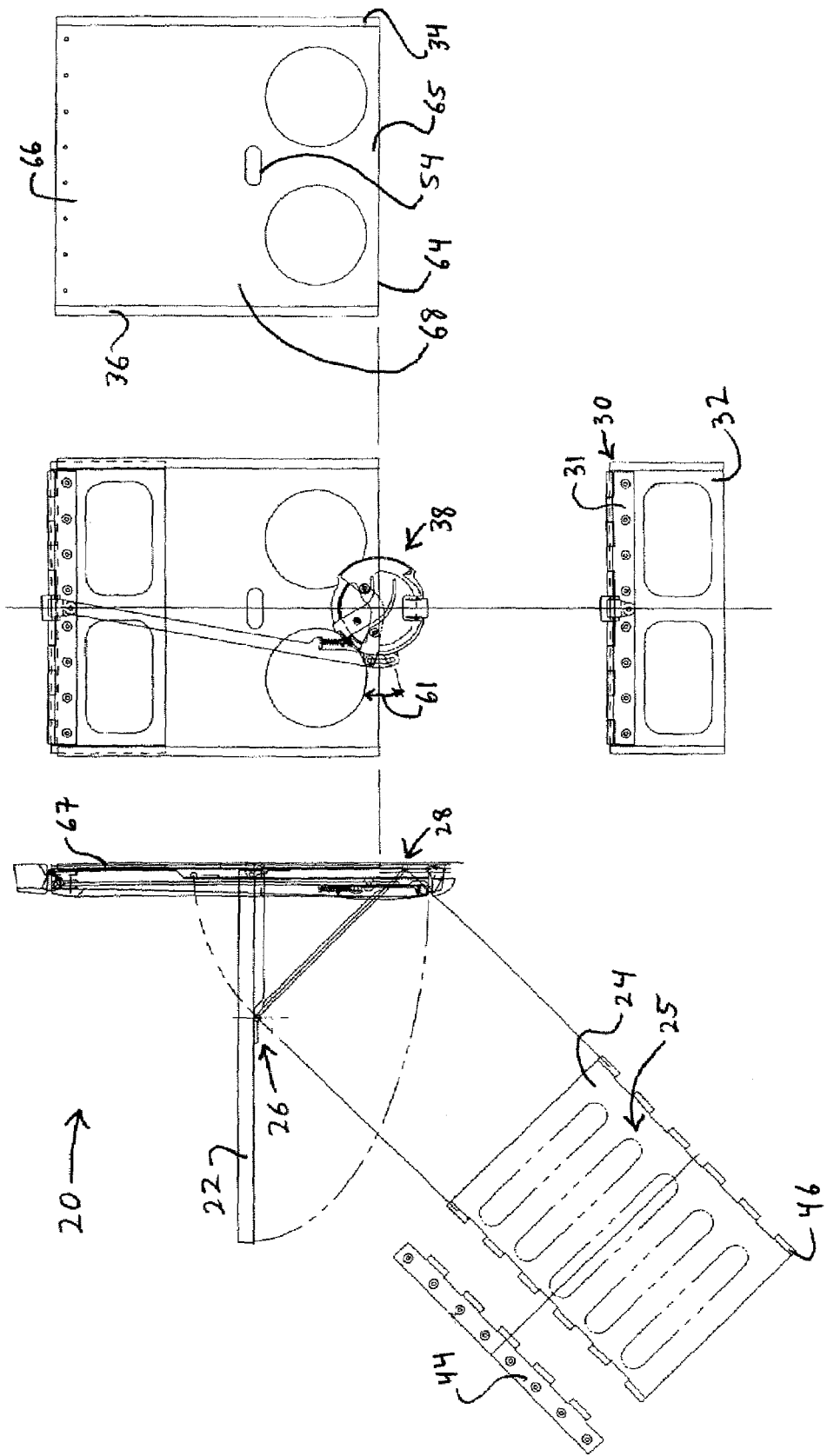
FIG. 7 shows an exploded view of the stowable surface of FIG. 4.

Optionally, a person of skill in the art would also recognize that the rails 34 and 36 may be constructed out of a slide rail support 33 or a back member 64. Moreover, the rails 34 and 36 may be connected directly to the optional back member 64 as shown in FIG. 6 and FIG. 7. FIG. 7 shows an exploded view of the stowable surface of FIG. 4. The back member 64 has a bottom end 65, a top end 66, a back side 67 and a front side 68, where the back side 67 may be attached to wall 10. Further, the lower end 46 of the support bracket 24 may be pivotally connected to the bottom end 65 of the optional back member 64 with the second pivotal coupler 28, thereby allowing for a completed assembly prior to affixing the stowable surface to a wall. Also, each member may have stiffener elements that increase their structural strength, such as the elongated elements 25 shown on support bracket 24 in FIG. 7.

It is further recognized that the pivotal couplers 26, 28, 30 have at least one rotational degree of freedom. However, in the present embodiment all of the pivotal couplers have only one rotational degree of freedom, all of which allow rotation generally in the same axial direction. The coupler forming the pivotal joint may be integrally made from one or both members of the constituent parts to which it pivotally joins. However, it is also recognized that the pivotal joint may be made from a typical hinge such as a piano hinge, which is then connected to each constituent part. Although not disclosed above, a pin may retain the two parts forming the pivotal joint or the two parts may form a complimentary hook and eyelet pivotal joint. Moreover, the two parts forming the pivotal joint may include any other suitable pivotal joint connector integrally constructed from the constituent parts, or otherwise. Where the pivotal joint is not integrally constructed from one or both of the constituent parts, the members of the pivotal joint may be fastened to each of the constituent parts by using an appropriate type of fastener.

Figure 8:
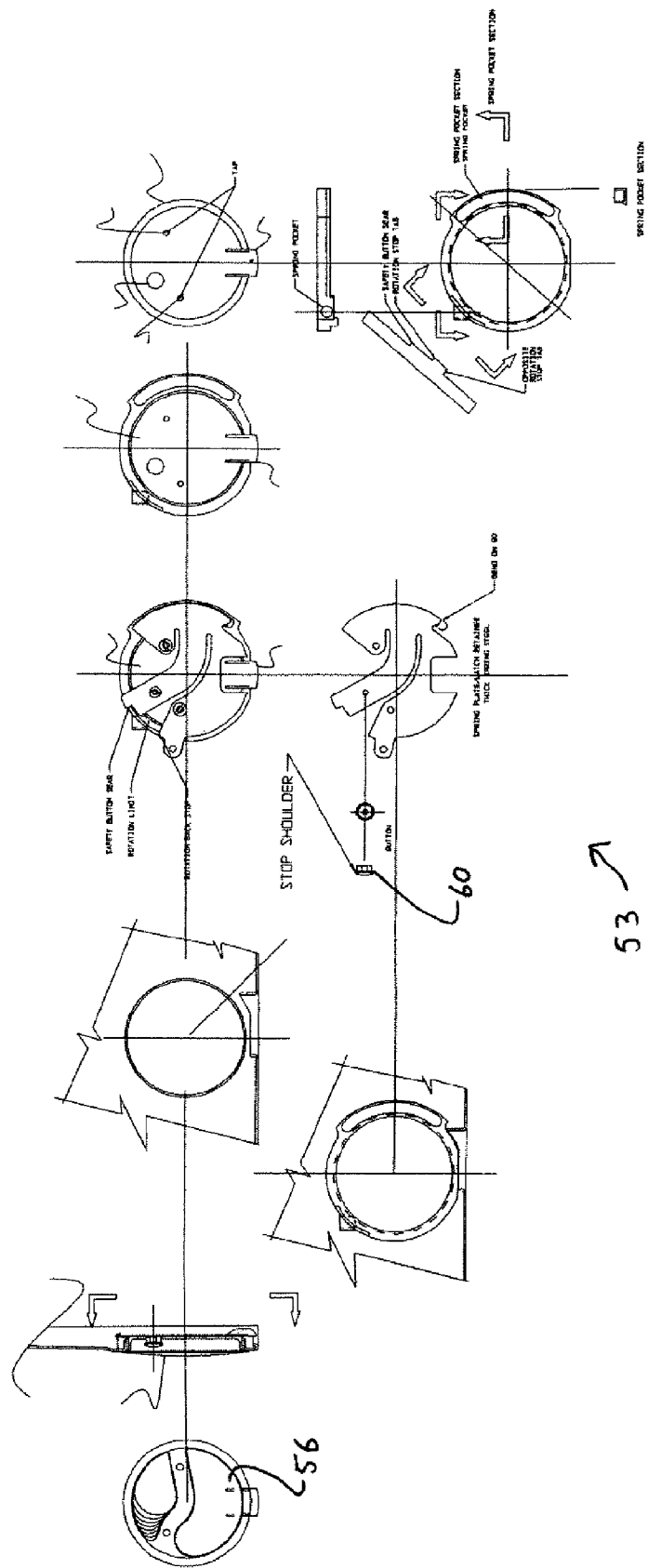
FIG. 8 shows a partial exploded view of the latch assembly used to advantage on the stowable surface of FIG. 4.

Returning to the first embodiment, the latch system 38 includes a latch assembly 53 connected to the tabletop 22, a deployed latch detent 54 on the wall 10, and an upper latch pawl 55 on the wall 10. The latch assembly is shown in FIGS. 6, 8 and 10. FIG. 8 is a partial exploded view of the latch assembly used to advantage on the stowable surface of FIG. 4. The latch assembly 53 includes a turn knob 56, a spring 57, a pull member 58 connected to the turn knob 56, and a hinged catch 59 connected to the pull member 58. The pull member 58 is biased by the spring 57 thereby releasably engaging the hinged catch 59 into the deployed latch detent 54 or the upper latch pawl 55. The hinged catch 59 is releasably disengageable from the deployed latch detent 54 or the upper latch pawl 55 when the turn knob 56 is rotated thereby overcoming the biased pull member 58. An operator who depresses a spring-loaded push button 60 while simultaneously rotating the turn knob 56 may actuate the latch assembly 53.

Figure 2:
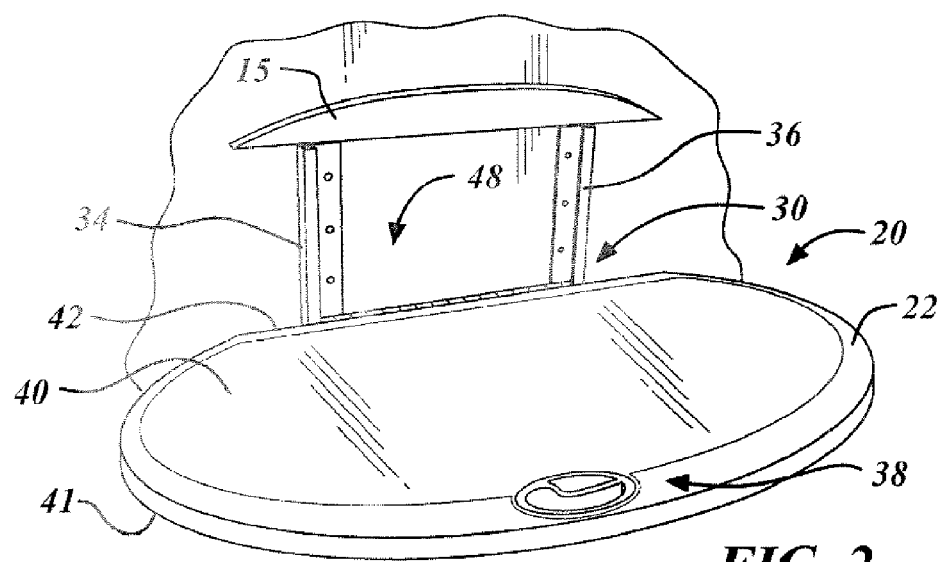
FIG. 2 shows a partial isometric view of the first embodiment of a stowable surface being used to advantage in a deployed position.

FIG. 2 shows a partial isomeric view of the first embodiment of a stowable surface 20 being used to advantage in a deployed position 48. The tabletop 22 of the stowable surface 20 is positionably retained to the wall 11 of the aircraft 10 by the rails 34, 36. Advantageously, the top surface 40 of the tabletop 22 is oriented upward allowing for its use.

Optionally, the stowable surface 20 may further include a spring stop (not shown) connected to one of the tabletop 22, the support bracket 24 and the wall 10, whereby the spring stop may compressively engage a different one of the tabletop 22, the support bracket 24 and the wall 10 when the tabletop is positioned into the stowed position 47. The spring stop may bias the assembly 20 into a snug stowed position when stowed, thereby reducing or eliminating noise associated with the vibrating parts during aircraft transport.

Figure 5:
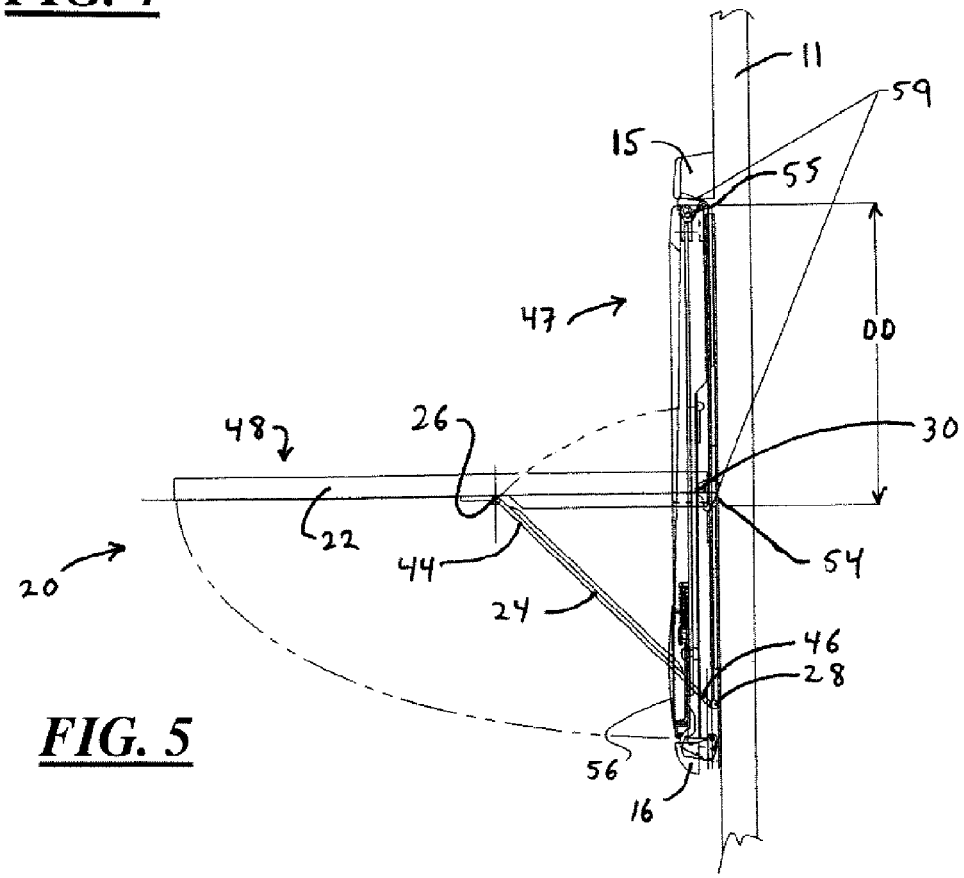
FIG. 5 shows an illustrative side view showing the first embodiment of the present invention positioned in both the stowed position and the deployed position.

FIG. 5 is an illustrative side view showing the first embodiment of the present invention positioned in both the stowed position 47 and the deployed position 48. The stowable surface 20 has a drop distance DD when positioned from the stowed position 47 and the deployed position 48.

It should be recognized that the first pivotal coupler 26 and the second pivotal coupler 28, each having a rotational degree of freedom about each coupler's constituent parts, allows the third pivotal coupler 30 with its multiple degree of freedom to transition the tabletop 22 into position. This unique combination of couplers allows the stowable surface to be deployed and stowed within a smaller envelope than compared to a table surface traditionally mounted on a single hinge. Accordingly, the inventive stowable surface increases functionality while saving costly deployment space.

Figure 3:
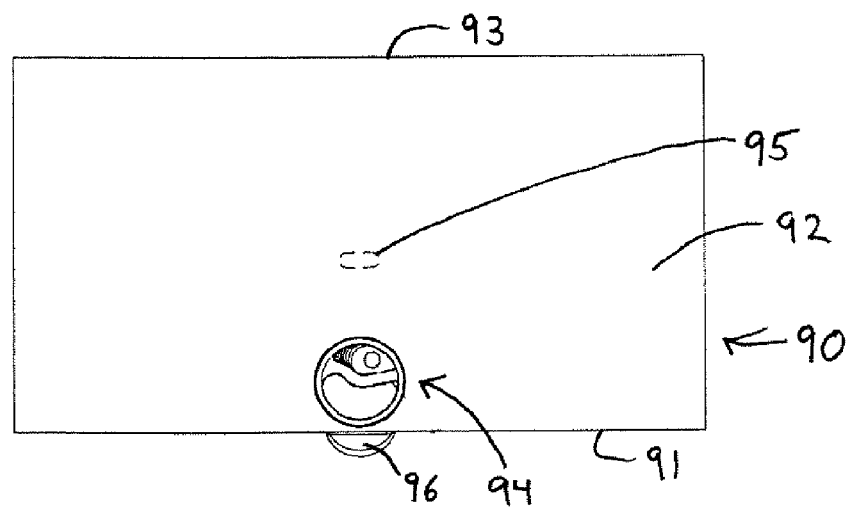
FIG. 3 shows a front view of a stowable table in accordance with a second embodiment of the present invention being used to advantage.

FIG. 3 shows a front view of a stowable table 90 in accordance with a second embodiment of the present invention being used to advantage. The stowable table 90 includes a tabletop 91, a support bracket (not shown) and a back member (not shown). The tabletop 91 has a top surface 92, a bottom surface and an end 93. The support bracket includes an upper end and a lower end, wherein the upper end is pivotally connected to the bottom surface of the tabletop 92.

The back member includes a bottom end, a top end, a back side and a front side, wherein the front side extends between the bottom end and the top end of the back member. The lower end of the support bracket is pivotally connected to the bottom end of the back member and the end 93 of the tabletop 91 is positionably connected to the front side of the back member, thereby allowing the tabletop 93 to be positioned between a stowed position and a deployed position when a latch assembly 94 is actuated. Also, the stowable table 90 of this embodiment is shown secured in the stowed position by the engagement of the latch assembly 94 and a strike plate 96.

Inventively, the top surface 92 of the tabletop 91 faces outward when stowed and upward when deployed, when the back side of the back member is selectively attached to a surface wall.

The tabletop 91 has a top surface 92 that is rectangular. Optionally, the tabletop may have any suitable shape, e.g. oval, square, semicircular, triangular, crescent or others shapes including partial shapes.

FIG. 9A is a partial cross-sectional side view of a stowable platform 70 in a stowed position in accordance with a third embodiment of the present invention being used to advantage. A stowable platform includes a first member 71, a second member 72 and a third member 73. The first member 71 has a first side 74, a second side 75 and a first end 76. The second member 72 has an upper end 77 and a lower end 78, whereby the upper end 77 is pivotally connected to the second side 75 of the first member 71. The third member 73 has a bottom end 79, a top end 80, a back side 81 and a front side 82, where the front side 82 extends between the bottom end 79 and the top end 80. The lower end 78 of the second member 72 is pivotally connected to the bottom end 79 of the third member 73, thereby allowing the first end 76 of the first member 71 to be positionably connected to the front side 82 of the third member 73 between a stowed position and a deployed position.

The pivotal connection between the first member 71 and the second member 72 is at a first pivot point 83. The pivotal connection between the second member 72 and the third member 73 is at a second pivot point 84. Also, the first member 71 is positionably connected to the front side 82 of the third member 73 about a pivot slide 85. Inventively, the first side 74 of the first member 71 faces outward when stowed and upward when deployed.

In this embodiment a frame member is formed whereby the back side 81 of the third member 73 is selectively attached to a recessed portion 88 of a wall 89, thereby providing an aesthetically pleasing flush mounting of the top surface or first side 74 of the first member 71 with surface of the wall 89. It is recognized that the frame member may optionally include the structure of a wall.

The first member 71 has a center of gravity that may be designed to advantage to coincide with a strategic location. Specifically, the first member 71 may have a center of gravity $C_g$ that is located between the first pivot point 83 and the second pivot point 84 when the table is in a deployed position, and the center of gravity transitions to the other side of the first pivot point 83 when the first member 71 is positioned into the stowed position. By locating the center of gravity on the first member 71 so that it transitions about the first pivot point 83, deployment and stowage of the first member 71 facilitates less effort or use of only one hand by an operator.

Optionally, the stowable platform 70 may also include at least one travel stop (not shown) connected to the wall 89, the rails (not shown) or the third member 73. The travel stop limits movement of the second part of the third pivotal coupler beyond the travel stop when the first member 71 is positioned into the deployed position. It is recognized that a travel stop is not needed in the stowed direction because the linkage lengths of the parts naturally limit the travel distance.

Optionally, a latch system, a latch assembly, a latch mechanism or any other type of securing or anchoring device may be attached to the first member 71 thereby allowing for positionable coupling to the third member 73.

FIG. 9B is a partial cross-sectional side view of the stowable platform 70 of FIG. 9A shown in a deployed position. The stowable platform 70 has a deployment drop DD when it is positioned between the stowed vertical position and the deployed horizontal position. The deployment drop is approximated by the relationship:

$$DD \cong L_P - (H_P^2 - T_P^2)^{1/2},$$

where $L_P$ is the length when stowed between the first end of the first member and the lower end of the second member being pivotally coupled to the bottom end, $H_P$ is the length between the pivotal couplings of the upper end and the lower end of the second member, and $T_P$ is the length between the upper end being pivotally coupled to the second side of the first member and the first end of the first member. It is recognized that the actual deployment drop will have a slight variation, which may be quantified or adjusted by COS(90-stowed angle) (given in degrees). When the stowed angle approaches zero, the variation approaches zero resulting in the above deployment drop approximation becoming the actual deployment drop.

Specific fasteners have not been discussed above. However, it is recognized that parts that have zero degrees of freedom when connected together may be so fastened in any suitable manner consistent with this disclosure, including without limitation: gluing, riveting, screwing, nailing, welding and crimping.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. A stowable platform comprising:
   a first member having a first side, a second side and a first end;
   a second member having an upper end and a lower end;
   a third member being a frame member comprising a main support member and a lower support member, said third member having a bottom end, a top end, a back side and a front side, said front side extending between said bottom end and said top end, said main support member farther comprising a first slide rail and a second slide rail;
   a first hinge;
   a second hinge; and
   a third hinge having a first part and a second part;
   wherein said first hinge pivotally couples said upper end of said second member to said second side of said first member, said second hinge pivotally couples said lower end of said second member to said lower support member of said frame member, said first end of said first member is positionably coupled to said main support member between a stowed position and a deployed position;
   wherein said first side of said first member faces outward when stowed and upward when deployed, whereby said back side of said third member is coupled to a surface wall;
   wherein said first slide rail and said second slide rail positionally retaining said second part of said third hinge upon said main support member, wherein said first end of said first member is coupled to said first part of said third hinge, thereby allowing a pivotal rotation between said first part and said second part of said third hinge while said second part is positioned along said main support member and wherein said second part of said third hinge is positioned along said first slide rail and said second slide rail;
   wherein said second part of said third hinge slides on said first slide rail and said second slide rail during the transition between said stowed position and said deployed position; and
   a latch assembly coupled to said first member which includes a deployed latch detent on said third member, and an upper latch pawl on said third member, said latch assembly comprising a turn knob, a spring, a pull member coupled to said turn knob, and a hinged catch coupled to said pull member, said pull member being biased by said spring thereby releasably engaging said hinged catch into said deployed latch detent or said upper latch pawl, and said hinged catch being releasably disengaged from said deployed latch detent or said upper latch pawl when said turn knob is rotated overcoming said biased pull member, allowing for a stowed position and a deployed position.

2. The stowable platform according to claim 1, wherein the first member is a tabletop.

3. The stowable platform according to claim 1, further comprising a tabletop having a tabletop top side and a tabletop bottom side, wherein said tabletop bottom side is coupled to said first side of said first member, wherein said tabletop top side faces outward when stowed and upward when deployed.

4. The stowable platform according to claim 1, wherein said first member has a center of gravity facilitating deployment of said first member when said first member is moved from said stowed position to said deployed position when said stowable platform is coupled to an upright surface, whereby said first member is easily positionable by an operator with only one hand.

5. The stowable platform according to claim 1, further comprising a spring stop coupled to said third member or said second member, wherein said spring stop is compressively engaged when said first member is positioned into said stowed position.

6. The stowable platform according to claim 1, wherein the frame member is a surface wall, whereby said main support member and said lower support member are coupled to said wall, where said lower support member is positionally lower than said main support member.

7. The stowable platform according to claim 1, wherein said first end of said first member has a deployment drop "DD" defined between the stowed position and the deployed position when said back side of said third member is coupled to a surface wall.

8. The stowable platform according to claim 7, wherein said deployment drop "DD" has the relationship approximated by:

$$DD \cong L_P - (H_P^2 - T_P^2)^{1/2},$$

when said first member is deployed from a vertical stowed position to a horizontal deployed position, where $L_P$ is the length when stowed between said first end of said first member and said lower end of said second member being pivotally coupled to said bottom end, $H_P$ is the length between the pivotal couplings of said upper end and said lower end of said second member, and $T_P$ is the length between the upper end being pivotally coupled to said second side of said first member and the first end of said first member.

9. A stowable table comprising:
a tabletop having a top surface, a bottom surface and an end;
a support bracket having an upper end and a lower end;
a back member being a frame member comprising a main support member and a lower support member, said back member having a bottom end, a top end, a back side and a front side, said front side extending between said bottom end and said top end, said main support member further comprising a first slide rail and a second slide rail;
a first hinge;
a second hinge; and
a third hinge having a first part and a second part;
wherein said first hinge pivotally couples said upper end of said support bracket to said bottom surface of said tabletop, said second hinge pivotally couples said lower end of said support bracket to said lower support member of said frame member, said end of said tabletop is positionably coupled to said main support member between a stowed position and a deployed position;
wherein said first slide rail and said second slide rail positionally retains said second part of said third hinge upon said main support member, wherein said end of said tabletop is coupled to said first part of said third hinge, thereby allowing a pivotal rotation between said first part and said second part of said third hinge while said second part is positioned along said main support member, and wherein said second part of said third hinge is positioned along said first slide rail and said second slide rail;
wherein said top surface of said tabletop faces outward when stowed and upward when deployed, whereby said back side of said back member is coupled to a surface wall; and
wherein said second part of said third hinge slides on said first slide rail and said second slide rail during the transition between said stowed position and said deployed position.

10. The stowable table according to claim 9, further comprising a latch system including a latch assembly coupled to said tabletop, a deployed latch detent on said back member, and a upper latch pawl on said back member, said latch assembly comprising a turn knob, a spring, a pull member coupled to said turn knob, and a hinged catch coupled to said pull member, said pull member being biased by said spring thereby releasably engaging said hinged catch into said deployed latch detent or said upper latch pawl, and said hinged catch being releasably disengaged from said deployed latch detent or said upper latch pawl when said turn knob is rotated overcoming said biased pull member allowing for a stowed position and a deployed position.

11. The stowable table according to claim 9, further comprising a spring stop coupled to one of said tabletop, said support bracket and said back member, wherein said spring stop compressively engages another one of said tabletop, said support bracket and said back member when said tabletop is positioned into said stowed position.

12. The stowable table according to claim 9, wherein the frame member is a surface wall, whereby said main support member and said lower support member are coupled to said wall, where said lower support member is positionally lower than said main support member.

13. The stowable table according to claim 12, further comprising a travel stop coupled to said back member, wherein said second part of said third hinge is limited by said travel stop when positioned into said deployed position, and wherein said tabletop has a center of gravity located between said first hinge and said second hinge when said table is in a deployed position, and said center of gravity transitions to the other side of said first hinge when said table is positioned into said stowed position, thereby facilitating deployment of said tabletop when said tabletop is moved from said stowed position to said deployed position, whereby said tabletop is easily positionable by an operator with only one hand.

14. A stowable surface comprising:
a first pivotal coupler;
a second pivotal coupler;
a third pivotal coupler having a first part and a second part;
a tabletop having a top surface, a bottom surface and a back end;
a latch system coupled to said tabletop;
a support bracket having an upper end and a lower end, wherein said upper end is pivotally coupled to said bottom surface of said tabletop by said first pivotal coupler;
a wall having a front side, and a lower portion and a mid portion located on said front side, wherein said lower end of said support bracket is pivotally coupled to said lower portion by said second pivotal coupler;
a first slide rail coupled to said wall extending from said lower portion through said mid portion; and a second slide rail parallel to said first slide rail coupled to said wall extending from said lower portion through said mid portion, said first slide rail and said second slide rail positionally retaining said second part of said third pivotal coupler between said slide rails, wherein said back end of said tabletop is coupled to said first part of said third pivotal coupler, thereby allowing pivotal rotation between said first part and said second part of said third pivotal coupler while said second part is positioned along said wall between a stowed position and a deployed position, wherein said second part of said third hinge is positioned along said first slide rail and said second slide rail, and wherein said top surface of said tabletop faces outward when in said stowed position and upward when in said deployed position, whereby said tabletop is releasably secured by said latch system in one of said deployed position and said stowed position; and
wherein said second part of said third pivotal coupler on said first slide rail and said second slide rail during the transition between said stowed position and said deployed position.

* * * * *